United States Patent Office 2,987,442
Patented June 6, 1961

2,987,442
METHOD OF TREATING HYPERTENSION WITH [2 - (2,6 - DIMETHYLPHENOXY) - PROPYL] - TRIMETHYL AMMONIUM SALTS
Richard A. McLean, Havertown, and Richard J. Mohrbacher, Drexel Hill, Pa., assignors to Smith Kline & French Laboratories, Philadelphia, Pa., a corporation of Pennsylvania
No Drawing. Filed Feb. 17, 1959, Ser. No. 793,688
4 Claims. (Cl. 167—65)

This invention relates to a medicinal composition in dosage unit form, which is useful as an antihypertensive agent and to a method for controlling hypertension which comprises administering to human beings the medicinal composition of this invention.

This invention also relates to novel isomers of the [2-(2,6 - dimethylphenoxy) - propyl] - trimethyl ammonium salts which are the active ingredients of the medicinal compositions of this invention.

This novel medicinal composition has outstanding activity as an antihypertensive agent.

The composition in accordance with this invention has a low incidence of side effects in a dosage range where closely related compounds, such as [2-(2,6-dimethylphenoxy)-ethyl]-trimethyl ammonium halides, produce undesirable muscarinic side effects which make them unsuitable for use as antihypertensive agents in human beings.

More specifically, the medicinal composition of this invention comprises a pharmaceutical carrier and a chemical compound having the following formula:

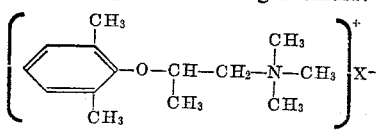

The nature of the anion X is not critical but, as will be understood, it should not be derived from an acid yielding a pharmacologically disadvantageous anion; that is to say X is a non-toxic pharmaceutically acceptable anion, typical examples being halide, such as chloride or bromide, bitartrate, tartrate, citrate, methosulfate, p-toluenesulfonate and neutral sulfate ions.

The d isomers of the [2 - (2,6 - dimethyl phenoxy)-propyl]-trimethyl ammonium salt can be substituted advantageously for the racemic mixture. Where the term [2-(2,6-dimethylphenoxy)-propyl]-trimethyl ammonium salt is employed without any indication as to the d, l or racemic form, it is intended herein and in the claims to cover the individual d and l isomers as well as mixtures thereof. The d-isomer, however, has been unexpectedly found to have a substantial portion of the therapeutic action of the racemic mixture and to be substantially free of side effects and, therefore, is the preferred form of this invention. The d isomer is approximately three times as active as the l isomer.

The composition of this invention is in dosage unit form and comprises a pharmaceutical carrier and a [2-(2,6-dimethylphenoxy)-propyl]-trimethyl ammonium salt, the latter beng present in an amount sufficient to administer from about 2 mg. to about 1200 mg., preferably about 50 mg. to about 400 mg. when administered parenterally, preferably intravenously. The dosage unit for oral administration is about 2 mg. to about 5000 mg., preferably about 50 mg. to about 2000 mg.

The method in accordance with this invention comprises administering internally a [2 - (2,6 - dimethylphenoxy)-propyl]-trimethyl ammonium salt, preferably employing the above described composition in an amount sufficient to produce antihypertensive activity. In this method the daily dosage regimen for parenteral administration is about 2 mg. to about 3600 mg. of a [2-(2,6-dimethylphenoxy) - propyl] - trimethyl ammonium salt, preferably divided into equal doses, one to three times a day, preferably the total daily dose is about 50 mg. to about 1200 mg. when administered parenterally, preferably intravenously. For the advantageous oral administration the total daily dosage is about 2 mg. to about 20,000 mg., preferably about 50 mg. to about 8000 mg., given in divided doses one to four times per day. When the administration described above is carried out, antihypertensive effects are obtained.

Intravenous doses are advantageously administered with about 200 ml. to about 1000 ml. of a 5% aqueous glucose solution over a period of about 20 to about 100 minutes.

The pharmaceutical carrier may be, for example, either a solid or a liquid. Exemplary of solid carriers are talc, corn starch, lactose, ethyl cellulose, magnesium stearate, agar, pectin, stearic acid, and acacia. Exemplary of liquid carriers are water, peanut oil, olive oil and sesame oil. Solid carriers are preferred.

A wide variety of pharmaceutical forms can be employed, for instance a tablet, a gelatin capsule, a lozenge or buccal tablet, a suspension or a sterile solution in saline. Thus, if the preferred solid carrier is used, the preparation can be tableted or placed in a hard gelatin capsule. If a liquid carrier is used, the preparation may be in the form of a soft gelatin capsule, as a liquid suspension or placed in an ampul.

The active and novel d-isomer of the [2-(2,6-dimethylphenoxy)-propyl]-trimethyl ammonium salt is prepared by dissolving the racemic salt in an anhydrous alcohol solution, for example methanol or ethanol, and pouring the solution slowly through a strongly basic anion exchange column to obtain the quaternary ammonium hydroxide. The alcoholic quaternary ammonium hydroxide solution is treated with an optically active acid, such as d-tartaric, d-dibenzoyltartaric or d-camphor-10-sulfonic acid to obtain the salt of the optically active acid. Recrystallization of the salt from a large amount of acetone, extraction of the solid material with hot acetone for about one hour and recrystallization of the undissolved material from alcohol, such as isopropanol, and from acetone gives the d-tartrate salt of the pure d-isomer.

The d-tartrate salt of the l-isomer is obtained by cooling the acetone extract obtained above and recrystallizing the resulting precipitate from acetone.

Other salts of the d and l isomers are obtained by allowing an alcoholic solution, preferably methanolic or ethanolic, of the tartrate salts prepared above to percolate slowly through a strongly basic anion exchange column to obtain the quaternary ammonium hydroxide. The quaternary ammonium hydroxide solution is then treated with at least an equivalent amount of the desired acid such as, for example, hydrochloric, hydrobromic, citric and sulfuric, to obtain the [2-(2,6-dimethylphenoxy)-propyl]-trimethyl ammonium salt.

*Example 1*

A solution of 50 g. of [2-(2,6-dimethylphenoxy)-propyl]-trimethyl ammonium chloride in one liter of anhydrous methanol is allowed to percolate slowly over a three-hour period through a column of Amberlite ion exchange resin (No. 400) which has been washed with aqueous 10% sodium hydroxide followed by water and anhydrous methanol. The quaternary ammonium hydroxide in methanol solution thus obtained is neutralized with 27.2 g. of d-tartaric acid. The solution is evaporated in vacuo and the residue is dissolved in two liters of boiling acetone. On cooling, a white precipitate is formed which is filtered off, dried, pulverized into a fine powder and extracted with 1.8 liters of boiling acetone. The material which remains undissolved is recrystallized several times from isopropanol and from acetone to give crystals of d-[2-(2,6-dimethylphenoxy)-propyl]-trimethyl ammonium d-tartrate, M.P. 167–9° C., $\alpha_D^{25°} = +36.5°$.

The acetone extract obtained above is cooled and the resulting precipitate is recrystallized three times from acetone. The crystals thus obtained are extracted with boiling acetone, the undissolved material is filtered off and the acetone extracts are cooled to give crystals of l-[2-(2,6-dimethylphenoxy)-propyl]-trimethyl ammonium d-tartrate, M.P. 156–8° C., $\alpha_D^{25°} = -13.5°$.

A methanol solution of 5.0 g. of d-[2-(2,6-dimethylphenoxy)-propyl]-trimethyl ammonium d-tartrate prepared as above is allowed to run slowly through a column of Amberlite ion exchange resin (No. 400), which has been washed with 10% sodium hydroxide solution, to give a methanolic solution of d-[2-(2,6-dimethylphenoxy)-propyl]-trimethyl ammonium hydroxide.

Treatment of the ammonium hydroxide solution with an excess of ethereal hydrogen chloried, concentration, cooling and dilution with ether gives d-[2-(2,6-dimethylphenoxy)-propyl]-trimethyl ammonium chloride.

*Example 2*

| | Mg. |
|---|---|
| dl-[2-(2,6-dimethylphenoxy)-propyl]-trimethyl ammonium chloride | 2 |
| Lactose | 225 |
| Starch | 50 |

The above ingredients are thoroughly mixed, granulated using a 10% gelating solution and compressed into a tablet using a talc-stearic acid mixture as a lubricant.

*Example 3*

| | Mg. |
|---|---|
| dl-[2-(2,6-dimethylphenoxy)-propyl]-trimethyl ammonium chloride | 500 |
| Lactose | 500 |

The powders are mixed, screened and filled into a #00 gelatin capsule.

The above capsule is administered one to four times per day.

*Example 4*

| | |
|---|---|
| dl-[2-(2,6-dimethylphenoxy)-propyl]-trimethyl ammonium chloride | g-- 5.0 |
| Lactose | mg-- 200 |

The ingredients are thoroughly mixed, granulated using a 50% sucrose solution and compressed into tablets with an admixture of starch and magnesium stearate.

*Example 5*

| | Mg. |
|---|---|
| dl-[2-(2,6-dimethylphenoxy)propyl]-trimethyl ammonium bromide | 75 |
| Peanut oil | 200 |

The ingredients are mixed to a thick slurry and filled into a soft gelatin capsule.

*Example 6*

| | G. |
|---|---|
| dl-[2-(2,6-dimethylphenoxy)-propyl]-trimethyl ammonium chloride | 3.10 |
| Citric acid | 0.16 |
| Sodium citrate | 0.35 |
| Sodium sulfate | 0.10 |
| Sodium bisulfate | 0.10 |
| Water for injection, q.s. 100 ml. | |

The citric acid and the sodium salts are dissolved in about 80 ml. of water. The dl-[2-(2,6-dimethylphenoxy)-propyl]-trimethyl ammonium chloride is dissolved in the aqueous solution and the volume is brought up to 100 ml. The solution is prefiltered through a medium sintered glass filter, then filtered through a Millipore in-line filter, filled into ampuls and autoclaved.

*Example 7*

| | G. |
|---|---|
| dl-[2-(2,6-dimethylphenoxy)-propyl]-trimethyl ammonium chloride | 3.10 |
| Sodium chloride | 0.17 |
| Water for injection, q.s. 100 ml. | |

The salts are dissolved in part of the water and then the volume is brought up to 100 ml. The solution is then filtered through a Millipore in-line filter, filled into ampuls and autoclaved.

What is claimed is:

1. The method of producing antihypertensive activity in a human being which comprises administering internally a quaternary ammonium salt of an amino phenyl ether of the formula:

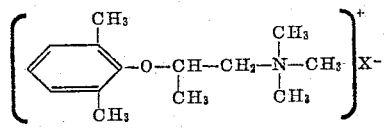

wherein X is a nontoxic, pharmaceutically acceptable anion, combined with a pharmaceutical carrier.

2. The method of claim 1 in which the method of administration is parenterally and the daily dosage regimen is about 50 mg. to about 1200 mg.

3. The method of claim 1 in which the method of administration is orally.

4. The method of producing antihypertensive activity in a human being which comprises administering internally a daily dosage regimen of about 50 mg. to about 8,000 mg. of a quaternary ammonium salt of an amino phenyl ether of the formula:

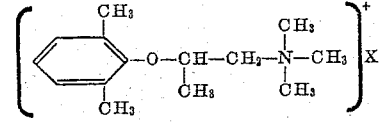

References Cited in the file of this patent

FOREIGN PATENTS 203,729    Australia _____ Aug. 27, 1956

OTHER REFERENCES

Allen et al.: Proc. of the Staff Meetings of the Mayo Clinic, 29:17, pp. 459–478, Aug. 25, 1954.